(12) United States Patent
Disch et al.

(10) Patent No.: US 12,345,354 B2
(45) Date of Patent: Jul. 1, 2025

(54) VALVE BLOCK AND METHOD FOR SUPPLYING CLEANING MEDIUM, AND USE OF A VALVE BLOCK

(71) Applicant: KENDRION (VILLINGEN) GMBH, Villingen-Schwenningen (DE)

(72) Inventors: Stefan Disch, Schonach (DE); Armin Scholz, Susel (DE); Jan Derjong, Kiel (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 108 days.

(21) Appl. No.: 18/010,296

(22) PCT Filed: Jun. 2, 2021

(86) PCT No.: PCT/EP2021/064884
§ 371 (c)(1),
(2) Date: Dec. 14, 2022

(87) PCT Pub. No.: WO2021/254784
PCT Pub. Date: Dec. 23, 2021

(65) Prior Publication Data
US 2023/0250892 A1  Aug. 10, 2023

(30) Foreign Application Priority Data
Jun. 15, 2020  (DE) .......................... 102020115754.1

(51) Int. Cl.
*F16K 37/00*  (2006.01)
*B60S 1/48*  (2006.01)
(Continued)

(52) U.S. Cl.
CPC ............ *F16K 37/0041* (2013.01); *B60S 1/48* (2013.01); *B60S 1/54* (2013.01); *F16K 27/003* (2013.01)

(58) Field of Classification Search
CPC ............... F16K 27/003; F16K 37/0083; F16K 37/0041; B60S 1/54; B60S 1/48
See application file for complete search history.

(56) References Cited

U.S. PATENT DOCUMENTS 5,651,391 A * 7/1997 Connolly ............ F16H 61/0251
137/454.6
8,794,266 B1 * 8/2014 Friedman ................ F16K 11/04
251/251
(Continued)

FOREIGN PATENT DOCUMENTS

CN  205504137 U  8/2016
DE  102018203215 A1  9/2019
(Continued)

OTHER PUBLICATIONS

Office action issue Jul. 14, 2020, in corresponding application DE10 2020 115754.1.
(Continued)

*Primary Examiner* — Jessica Cahill
(74) *Attorney, Agent, or Firm* — Nath, Goldberg & Meyer; Jerald L. Meyer; Morgan D. Rosenberg

(57) ABSTRACT

The invention relates to a valve block (10) for use in supplying cleaning medium to a plurality of consumers. The invention further relates to a method for supplying cleaning medium and to a use of a valve block (10). The valve block (10) according to the invention comprises at least one cleaning medium supply connection (22), a plurality of switching valves (24, 26) connected to the at least one cleaning medium supply connection (22), a control unit (14) which is configured to control the switching valves (24, 26) in an alternating manner individually and/or several of the switching valves (24, 26) simultaneously, and a position detection unit which is configured to determine the switch-
(Continued)

Figure 1:
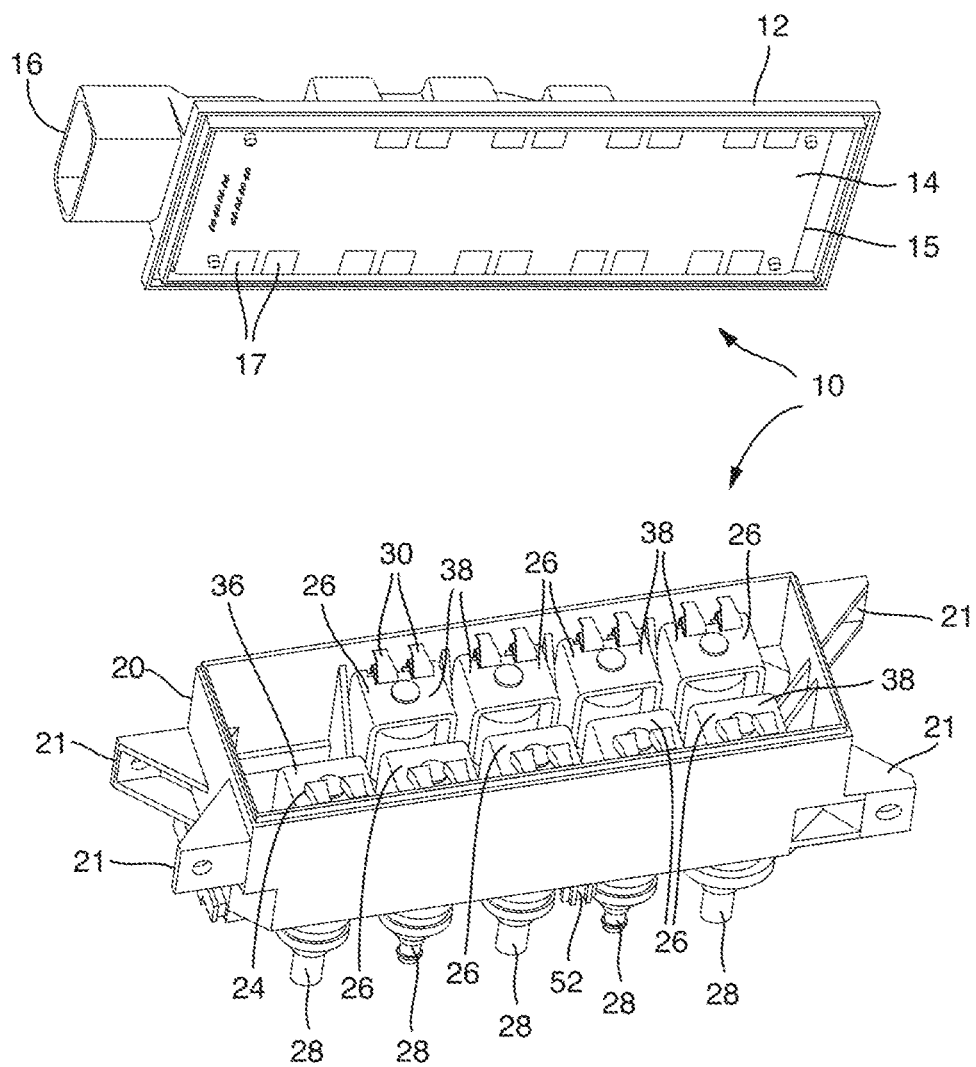

ing position of at least one switching valve (24, 26) without a sensor.

11 Claims, 4 Drawing Sheets

(51) Int. Cl.
*B60S 1/54* (2006.01)
*F16K 27/00* (2006.01)

(56) References Cited

U.S. PATENT DOCUMENTS

| | | | |
|---|---|---|---|
| 11,143,319 B2* | 10/2021 | Jenkins | F16K 31/52491 |
| 11,318,914 B2* | 5/2022 | Krishnan | B60S 1/481 |
| 2006/0220598 A1* | 10/2006 | Argo | B60S 1/481 |
| | | | 318/446 |
| 2013/0292488 A1* | 11/2013 | Jeuffe | B60S 1/48 |
| | | | 239/127 |
| 2014/0109990 A1* | 4/2014 | Brashear | A01G 25/16 |
| | | | 137/343 |
| 2016/0152213 A1* | 6/2016 | Baerg | B60S 1/603 |
| | | | 134/56 R |
| 2017/0182980 A1* | 6/2017 | Davies | B05B 9/04 |
| 2018/0201138 A1* | 7/2018 | Yellambalase | B60L 58/12 |
| 2019/0359178 A1* | 11/2019 | Hornby | B60S 1/481 |
| 2020/0248831 A1* | 8/2020 | Keeper | F16K 31/1221 |
| 2021/0262586 A1* | 8/2021 | Nagano | F16K 37/0041 |
| 2023/0173521 A1* | 6/2023 | Baudouin | B05B 1/3006 |
| | | | 239/124 |

FOREIGN PATENT DOCUMENTS

| | | | | |
|---|---|---|---|---|
| FR | 3089273 | A1 | 6/2020 | |
| FR | 3106508 | A1 * | 7/2021 | B05B 1/3006 |
| JP | S62-167985 | A | 7/1987 | |
| JP | H08-213231 | A | 8/1996 | |
| JP | 2001-253338 | A | 9/2001 | |
| JP | 2008-190566 | A | 8/2008 | |
| WO | 2001/014190 | A1 | 3/2001 | |
| WO | 2021/159688 | A1 | 11/2012 | |

OTHER PUBLICATIONS

International Search Report of PCT/EP2021/064884 issued Feb. 11, 2022.
Partial Search Report of PCT/EP2021/064884, Form PCT/ISA/206 and EPA Form 17017 04.17, dated Nov. 15, 2021.
Office action issued by the JPO on Feb. 13, 2025, in parallel pending Japanese patent application No. 2022-576846, with English translation.

\* cited by examiner

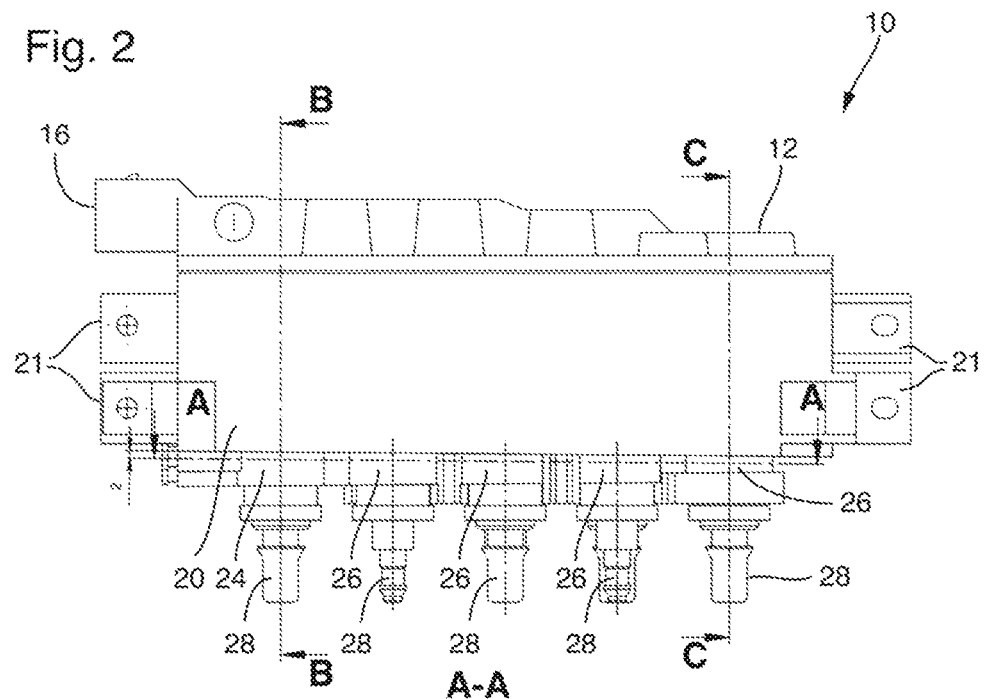
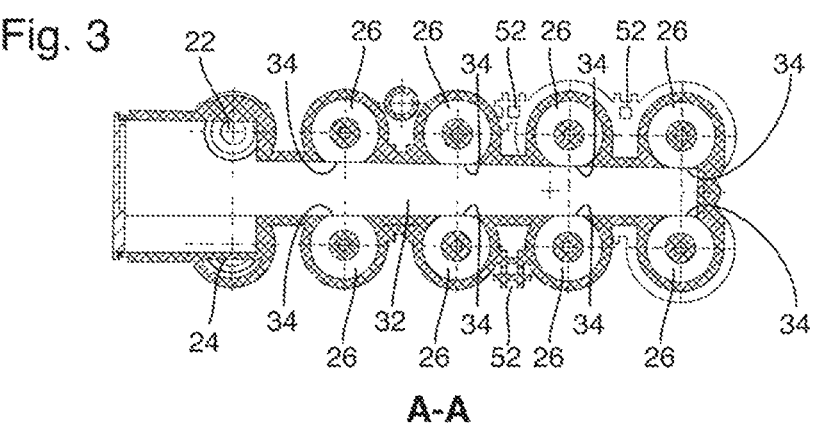

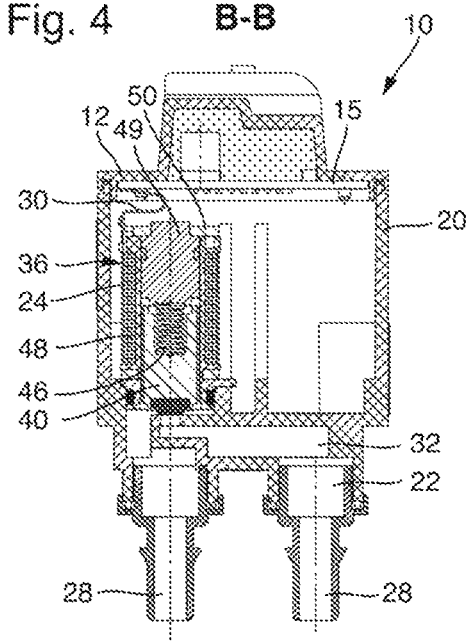
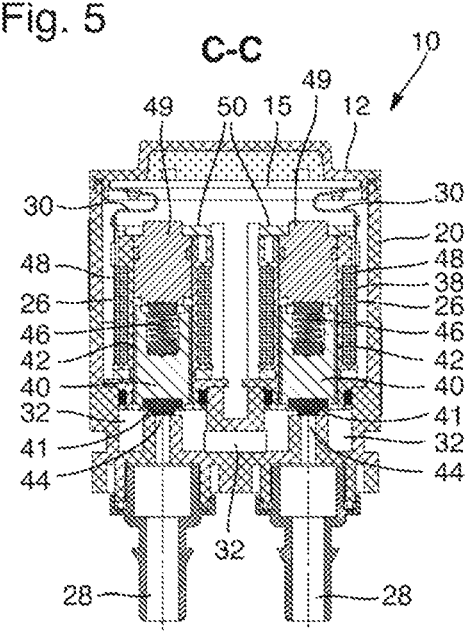

VALVE BLOCK AND METHOD FOR SUPPLYING CLEANING MEDIUM, AND USE OF A VALVE BLOCK

This is a National Phase Application filed under 35 U.S.C. 371 as a national stage of PCT/EP2021/064884, filed Jun. 2, 2021, an application claiming the benefit of German Application No. 10 2020 115754.1 filed Jun. 15, 2020, the content of each of which is hereby incorporated by reference in its entirety.

The invention relates to a valve block and a method for supplying cleaning medium to a plurality of consumers and use of a valve block.

The present invention relates to the field of supplying cleaning medium in distributed systems. Cleaning media such as a washing liquid or compressed air are required, for example, in modern motor vehicles for cleaning the windshield, the back window, the headlights, but also for cleaning the ever-increasing number of sensors that provide the motor vehicle with information about the environment as part of driving assistance systems that are relevant to safety. These may include, but are not limited to, among others, front and rear cameras, distance sensors such as LIDAR (light detection and ranging) or LADAR (laser detection and ranging), and possibly lane departure warning sensors. Over the course of the development of autonomous vehicles, the number of sensors will continue to increase. The safety of vehicle operation also depends on the functionality of the sensors.

Up to now, the individual consumers have each been supplied with a cleaning medium via their own pumps, which are activated in the case of need. Notwithstanding that such pumps are now available in quite small sizes, they add undesirable weight to the vehicle.

The invention is based on the task of supplying dispersed consumers with one or more cleaning media with a high degree of flexibility, low complexity and low overall weight, and of ensuring the functional reliability of vehicle operation even with an increasing number of driving assistance systems that are relevant to safety, right through to autonomous vehicles.

This task is solved by a valve block for use in supplying cleaning medium to a plurality of consumers, comprising at least one cleaning medium supply connection, a plurality of switching valves connected to the at least one cleaning medium supply connection, a control unit which is configured to control the switching valves in an alternating manner individually and/or several of the switching valves simultaneously, and a position detection unit which is configured to determine the switching position of at least one switching valve without a sensor.

The functionality of the valve block is thus to detect the switching position of the switching valves without additional sensors. The switching valves are electrically controlled solenoid valves. The switching valves have two defined positions in which the cleaning medium, for example, a washing liquid or compressed air, is either passed on to a consumer or not. The unpowered resting state is generally a closing state in which an armature is pressed against a valve seat by means of a spring and, in this way, the valve closes. Various known constructions exist for this purpose. When a coil of the switching valve is powered, the armature is moved away from the valve seat counteracting the spring force, thus opening the valve. In position detection without sensors, the switching magnet simultaneously performs the function of actuator and sensor since the change in the switching position and the change in the electromagnetic properties of the switching valve are alternatively dependent on each other. The position detection unit can measure the electromagnetic properties, in particular the inductance, of the valve system and thereby detect the switching position.

This functionality opens up the possibility of self-diagnosis of the cleaning system and thereby the early detection of problems right through to detection of system failure. The position detection without sensors in the valve block thus ensures the functional safety of the vehicle with regard to the fouling of sensors relevant to safety.

In embodiments, the position detection unit is configured as part of the control unit.

The fact that, in embodiments, at least one of the switching valves is configured as a switchable overpressure valve, contributes to operational safety. The switchable overpressure valve provides safety by relieving the cleaning system when the pressure of the cleaning medium exceeds a pressure set at the overpressure valve. The cleaning medium is then either discharged from the overpressure valve into the environment or returned to a cleaning medium tank. Since the overpressure valve is configured to be switchable, the control unit can also open the overpressure valve in other situations if this is required for operational reasons. Equipping the switchable overpressure valve with position detection without sensors also enables the system to detect when the overpressure valve opens, for example, due to overpressure in the cleaning system.

In embodiments, the position detection unit is configured, in particular by means of an LED driver unit, to feed into at least one current measurement circuit, comprising one or a plurality of the switching valves, one measuring signal, in particular a pulse-width modulated signal, with a plurality of pulses, which is dimensioned such that the position of the switching valve or switching valves is not influenced, and to measure the course of the current intensity and compare it with one or more expected values which form a measure of whether and how many of the switching valves in the current measurement circuit are in an open position. When a current pulse is fed into the current measurement circuit that passes through one or more of the coils of the switching valves, the current that flows through the measurement circuit increases with a delay due to the inductance of the coil and armature system. As the armature extends into the coil to different degrees in its various positions, the inductance of the system also changes. This affects how quickly the rise of the measuring current in the measuring circuit proceeds. The greater the inductance, the slower the rise in the current. The course, or alternatively the value of the current in the measuring circuit reached after a certain time is thus dependent on the position of the armature in the coil and can be compared with previously determined values.

The measuring signal should not be so strong that the armature in the coil is actually moved. Suitable pulse strengths can be determined by suitable measurements in advance of use. A particularly suitable form of a measuring signal is a sequence of fast and short pulses, each of which causes only a short current increase, but which follow one another so closely that their effect on the current strength in the measuring circuit accumulates to a value which, in the case of a single pulse, would lead to a change in position, however not in the sequence of short pulses. Typical values for this are 5 to 15 pulses, for example, square pulses, with a frequency of approx. 10 kHz to 100 kHz at a duty cycle of 20% to 70%. Suitable values depend on the selected coil and armature parameters and can easily be determined in tests.

The measuring signals can be superimposed on the actual switching signals from the control unit. The system response of the measuring circuits to the measuring pulses does not depend on whether a switching valve is currently powered or not, but rather only on the armature position. This can deviate from the state of powering if the valve has a malfunction.

In embodiments, a separate current measurement circuit is present for each switching valve, wherein the measurement in each current measurement circuit is carried out individually, in particular in a cyclical sequence via the switching valves, or with respect to a sum signal from all current measurement circuits, wherein a separate current measurement circuit is, in particular, present for at least one switchable overpressure valve, which current measurement circuit is evaluated with respect to the position of the at least one switchable overpressure valve. The different variants require differently equipped position detection units. If each switching valve has its own current measuring circuit, the position detection unit can either have its own measuring circuit for each current measuring circuit, or a sum signal is formed from which it is determined whether 0, 1, 2 or more switching valves are open. Since it is known which switching valves should be open at the time of measurement, it can be determined whether these switching valves are also reliably open. Normally, no more than two consumers are supplied with a cleaning medium at the same time, so that this cost-saving embodiment can be sufficient. However, the switchable overpressure valve is preferably monitored individually because it is relevant to safety for the cleaning system per se.

A further aspect of the invention relates to a valve block for use in supplying cleaning medium to a plurality of consumers, comprising at least one cleaning medium supply connection, a plurality of switching valves connected to the at least one cleaning medium supply connection, and a control unit configured to individually control the switching valves, wherein the valve block is, in particular, configured according to a previously described embodiment example with valve position detection without sensors, wherein the valve block comprises a valve manifold housing with the at least one cleaning medium supply connection and the plurality of switching valves connected to the at least one cleaning medium supply connection, as well as a cover in which the electronic control unit of the valve block is accommodated and which can be assembled with the valve manifold housing to form the valve block.

According to this aspect of the invention, which can also be used in combination with the first aspect of the invention relating to valve position detection without sensors described above, instead of a distributed system in which each consumer is assigned its own pump, a valve block is used which centralizes the supply of cleaning medium to the consumers. The valve block has a cleaning medium supply connection, through which one or a plurality of cleaning media are introduced under pressure into the valve block, as well as a sufficient number of switching valves, which distribute the cleaning medium or cleaning media to the various consumers. Thus, a single high-pressure pump is sufficient to supply all consumers with cleaning medium. The switching valves are controlled by the control unit. This one is accommodated in the cover of the valve block, which can be removed from the valve manifold housing so that the valve block can also be easily maintained and repaired.

The use of the valve block as the central switching point for supplying cleaning medium also reduces the weight, as the valve block weighs less than the sum of the pumps that are dispensed with. In addition, weight can also be saved with regard to the cabling since the pumps that are dispensed with no longer need to be supplied with their own electrical cables.

The valve block according to the invention may have a switchable overpressure valve. The overpressure valve is configured in such a way that it opens when a preset pressure on the side of the cleaning medium supply connection is exceeded, thus leading to a reduction of the pressure in supplying the cleaning medium. For this purpose, it is, for example, configured in the manner of a safety valve. The overpressure valve is also configured to be switchable, by way of example as an electrically actuated solenoid valve, so that it can also be controlled by the control unit.

Due to the fact that the valve block according to the invention has its own control unit, makes it possible to adapt the valve block to different environments, for example vehicle types or vehicle equipment, and to program it accordingly. For this purpose, the control unit can, for example, have a flash memory which is written to according to the assignment and control of the individual valves. Other memory options known in the prior art can also be used here.

A particularly simple and advantageous embodiment provides that electrical connections between the electrical control unit on the one hand and the plurality of switching valves, and, in particular, the switchable overpressure valve on the other hand, can be or are established via electrically conductive spring contacts, in particular contact springs. This measure provides a simplification both of the manufacture and of the maintenance and repair of the valve block. When the cover is detached from the valve manifold housing, the electrical connection of such a spring contact is completely released by itself. The cover can be removed from the valve manifold housing without these elements still being connected to each other by electrical cables. At the same time, the spring contacts, in particular contact springs, which press against corresponding electrically conductive contact surfaces on the circuit board of the control unit, ensure reliable and uninterrupted electrical contact as soon as the cover is placed back on the valve manifold housing and connected to it.

In embodiments of the invention, the connection of the at least one cleaning medium supply connection to the switching valves occurs via at least one central supply channel, which central supply channel, on two opposite sides, respectively has connections, in particular wall openings, to the individual switching valves, which switching valves are arranged in two rows on both sides of the central supply channel, wherein, in particular a plurality of cleaning medium supply connections and supply channels for different cleaning media, in particular a washing liquid and compressed air, are provided, which are connected to different switching valves. The switching valves are preferably arranged essentially perpendicular to an orientation of the central supply channel. This ensures a clearer and at the same time more compact construction, which simplifies handling of the valve block. Since no valve is located on the inside due to the double-row arrangement, all valves are equally easy to reach by hand in order to connect them to the hoses for supply of the consumers. At the same time, since all switching valves are oriented to one side, this makes it possible to arrange the valve block in a vehicle in such a way that all outputs are equally well controlled and supplied with a cleaning medium, even during changes in driving conditions such as while under acceleration, in curves or during braking.

Preferably, a cleaning medium is fed axially through the at least one switchable overpressure valve and radially through the other switching valves. The radial feeding of the cleaning medium to the switching valves ensures that a high throughput can be achieved. In an advantageous further development, a switchable overpressure valve is connected to the cleaning medium supply connection and is fed axially with cleaning medium. The axial feeding of the overpressure valve underpins the function of the overpressure valve as a safety valve.

The switching valves differ from the overpressure valve in the embodiments. By way of example, the switching valves are kept closed with a first spring force and the at least one switchable overpressure valve is kept closed with a second spring force, which is greater than the first spring force and, in particular, has a different coil body than the switching valves.

The spring force for the switching valve can be kept low, in particular if this is underpinned by construction measures. In the embodiments, the valve armatures of the switching valves are each mounted with an interspace in the switching valve, which switching valve is in fluid connection with the cleaning medium supply connection and is sealed off from the axially rear part, which is arranged opposite the respective cleaning medium outlet of the switching valve, wherein the fluid also acts in particular on the rear side of the valve armature, and/or the valve armatures of the switching valves each have a sealing cone. The switching valves should be closed when in undetermined state and prevent the cleaning medium from reaching the consumers. For this purpose, the switching valves are usually equipped with springs that push them towards a closed state in the undetermined state. Due to the interspace, and in particular due to the fact that the back of the valve armature is also put under strain by the pressurized cleaning medium, an additional pressure is exerted in the direction of the closing seat, such that the spring force can be configured to be relatively low. In addition or alternatively to this, the configuration of a part of the valve armature with a sealing cone increases the tightness of the seat of the valve armature in its opening to be sealed, such that the spring force to be applied can also be kept low by this measure.

In embodiments of the valve block, the switching valves are provided or can be provided with individually weldable valve connections, by way of example, with standardized connection nozzles of the same or different sizes. This allows the valve block to be flexibly adapted to different conditions of the system without any other modifications, for example different consumers which have different requirements for the quantity and pressure of the cleaning medium.

Preferably, the electronic control unit is configured to switch a plurality of the switching valves simultaneously. In this way, a plurality of consumers can be supplied simultaneously with one or more cleaning media. Moreover, the electronic control unit can be set up in such a way that it can control the high-pressure pump so that, depending on requirements, it can supply the cleaning medium to the valve block at different pressures. In this case, the electronic control unit has preferably implemented a logic that ensures that only consumers that are to be controlled with the same pressure are supplied with the cleaning medium at the same time.

With a particularly safe embodiment of the valve block to be fitted, the side of the valve block, in particular of the valve manifold housing, on which the valve connections are arranged, is provided with an orientation-giving structuring that is mirror-image and rotationally asymmetrical. The structuring serves as a coding in the sense of a "Poka Yoke", so that even with an otherwise symmetrical arrangement of the switching valves, there is no ambiguity about the orientation and assignment of the switching valves to the individual consumers. The structuring enables an easy ability to code the slots and hose nozzles.

The task underlying the invention is also solved by a method for supplying cleaning medium with a valve block according to the invention described above, wherein a control unit of the valve block controls one or a plurality of the switching valves of the valve block in order to open or close them, wherein a position detection unit determines the switching position of at least one switching valve in a manner without sensors, wherein the position detection unit, in particular, feeds into at least one current measuring circuit which comprises one or a plurality of the switching valves, one measuring signal, in particular a pulse-width modulated measuring signal, with a plurality of pulses, which is dimensioned such that the position of the switching valve or the switching valves is not influenced, measures the course of the current intensity and compares it with one or more expected values, which form a measure of how many of the switching valves in the current measuring circuit are in an open position.

This method has the same properties, advantages and features as the valve block configured for position detection without sensors according to the invention.

The task underlying the invention is further solved by a use of a valve block according to the invention described above in a system according to the invention described above for supplying cleaning medium to a plurality of consumers, in particular in a motor vehicle, wherein, in particular, the plurality of consumers comprises a plurality of sensors to be cleaned.

The use of the valve block according to the invention in the system according to the invention for supplying cleaning medium to the plurality of consumers also realizes the features, properties and advantages described for the other subject matters of the invention.

Further features of the invention will become apparent from the description of embodiments according to the invention together with the claims and the accompanying drawings. Embodiments according to the invention may fulfill individual features or a combination of a plurality of features.

In the framework of the invention, features marked "in particular" or "preferably" are to be understood as optional features.

Figure 6:
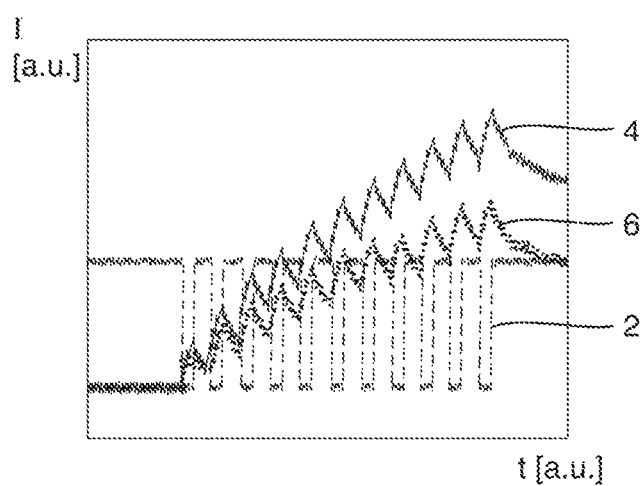

The invention is described below, without limiting the general idea of the invention, by means of embodiment examples, with reference made to the drawings, wherein express reference is made to the drawings with respect to all details of the invention not explained in greater detail in the text. Wherein:

FIG. 1 shows a schematic perspective view of the valve block according to the invention in the open state, FIG. 2 shows a schematic side view of the valve block, FIG. 3 shows a cross-sectional view through the valve block, FIG. 4 shows a further cross-sectional view through the valve block, FIG. 5 shows a further cross-sectional view through the valve block, and FIG. 6 shows measuring signal responses to a measuring signal according to the method according to the invention.

In the drawings, the same or similar elements and/or parts are provided with the same reference numbers, so that a renewed presentation can, in each case, be dispensed with.

All the features mentioned, including those to be taken from the drawings alone as well as also individual features disclosed in combination with other features, are regarded alone and in combination as essential to the invention. Embodiments according to the invention can be fulfilled by individual features or a combination of a plurality of features.

FIG. 1 shows a schematic perspective view of a valve block 10 according to one aspect of the invention in the open state. The aspect of the invention of position detection without sensors at the switching valves may be realized simultaneously and is described in connection with FIG. 6 below.

The underside of the cover 12 is shown in the upper part of FIG. 1, in which cover a circuit board 15 of an electronic control unit 14 is arranged, which circuit board has contact surfaces 17 on its underside, only two of which are directly designated. Further pairs of contact surfaces 17 are drawn on the other long sides of the circuit board 15. The cover 12 further comprises a connection 16, by way of example a socket with contacts (not shown).

A valve manifold housing 20 is shown in the lower part of FIG. 1, the perspective view looks into the interior of the valve manifold housing. Eight switching valves 26 are arranged therein in two parallel rows of four switching valves 26 each, as well as an overpressure valve 24, which has two contact springs 30 on its upper sides which, when the valve block 10 is closed, make contact with the contact surfaces 17 on the circuit board 15 of the electronic control unit 14 and thus establish electrical connections. The connection grommets 28 welded to the valve manifold housing 20 are shown on the underside of the valve manifold housing 20. These grommets can have different dimensions and are preferably standardized.

The valve manifold housing 20 has four fixing points 21 for fixation in an outer frame. The switching valves 26, like the overpressure valve 24, are configured as solenoid valves. The magnetic return elements and coil bodies 38 are visible in FIG. 1. There is no switching valve opposite the overpressure valve 24. At said location, a cleaning medium supply connection 22 is concealed on an underside.

In FIG. 2, the valve block 10 of FIG. 1 is shown schematically from the outside. The connection grommets 28 are those of the row of switching valves 26, which also contain the overpressure valve 24. The connection grommets 28 of the other row are hidden behind it in perspective.

Three cross-sectional planes A-A, B-B and C-C defining the cross-sections shown in FIGS. 3, 4 and 5 are shown in FIG. 2. The horizontal cross-section in the plane spanned by cross-sectional plane A-A is shown in FIG. 3 and defines the cross-section through the portion of valve block 10 that includes one central supply channel 32 of valve block 10. The cleaning medium supply connection 22 opens directly into the central supply channel 32. A cleaning medium introduced into the valve block 10 through the cleaning medium supply connection 22, for example, a washing liquid, first fills the central supply channel 32. From there, the cleaning medium passes through the wall openings 34 into the ring-shaped cavities of the switching valves 26, which are radially fed. Unlike the switching valves 26, the overpressure valve 24 is not fed medium radially, but rather axially. In the cross-sectional plane A-A shown, there is no connection to the overpressure valve 24.

A structuring 52 is also visible in FIG. 3 at several points, which structuring serves to prevent errors when connecting hoses for the cleaning medium to the connection grommets 28. This structuring is not mirror-image symmetrical and also not rotationally symmetrical, so that there can be no doubt about the orientation of the valve block 10 when making the connections to the hoses leading to the consumers.

FIG. 4 shows a first vertical cross-section in the cross-sectional plane B-B of the valve block 10 of FIG. 2. This plane intersects the part of the valve block 10 in which the cleaning medium supply connection 22 and the opposite overpressure valve 24 are located. The cleaning medium supply connection 22 opens directly into the central supply channel 32 and is connected to it without obstruction. The cavity of the central supply channel 32, which is filled with cleaning medium under high pressure via the cleaning medium supply connection 22, opens out with an opening on the valve armature 40 of the overpressure valve 24 and acts upon the valve armature 40 axially. The valve armature may be mounted in plastic, is spring-biased with a spring 46 and opens when the pressure of the cleaning medium in the central supply channel 32 exceeds the opposing force of the spring 46. When the valve armature 40 of the overpressure valve 24 is raised, the connection between the central supply channel 32 and the overflow connection provided with a connection grommet 28 is established such that cleaning medium can be discharged through the overflow connection until the pressure of the cleaning medium again falls below the closing pressure of the spring 46.

The overpressure valve 24 is simultaneously also a switchable solenoid valve. To this end, the overpressure valve 24 also has a coil body 36 and a coil 48.

The coil body 36 comprises the internal parts, which is to say, among others, the spring 46 and the valve armature 40, a coil core 49 and also a magnetic return element 50. In this manner, the electronic control unit 14 of the valve block 10 may open and close the overpressure valve 24 even if there is no excess overpressure. This can, for example, occur in order to fill a second cleaning medium supply tank. The return element 50 can be constructed as a two-part return plate, in particular made of identical parts, which facilitates manufacture and assembly.

In FIG. 5 a cross-section through the valve block 10 of FIG. 2 in the vertical cross-sectional plane C-C is shown, which plane passes through a pair of switching valves 26. The switching valves 26 are structurally the same or similar to the switchable overpressure valve 24, they do however differ from the switchable overpressure valve 24 in the dimensions of the individual elements, since they have a different task than the overpressure valve 24 and, in contrast to the overpressure valve 24, are fed radially and not axially. Around the respective valve armature 40, each switching valve 26 exhibits an interspace 42 that extends around the periphery of the valve armature 40 and reaches to the top of the valve armature 40. The interspace 42 is in permanent communication with the central supply channel 32 and is filled with cleaning medium that is under high pressure. Since the cleaning medium thus exerts pressure on the upper side of the valve armature 40 in the closing direction, the spring force of the springs 46 required to close the switching valves 26 is low. The springs 46 can be configured weaker and smaller than the spring 46 in the overpressure valve 24. In this manner, a "self-sealed" function of the switching valves 26 is realized and leakage is maintained very low.

The underside of the respective valve armature 40 presses on a cleaning medium outlet 44, which opens into a respective connection grommet 28. In order to increase the tightness and to ensure that a comparatively low spring force is sufficient for a tight seal, the respective valve armature 40 is, in each case, contoured as a sealing cone 41, which ensures a secure and tight fit on the opening of the cleaning medium outlet 44. When the respective valve armature 40 is lifted by current supply to the respective coil 48, the connection between the central supply channel 32 and the cleaning medium outlet 44 of the switching valve 26 is opened, and the cleaning medium under high pressure passes through the switching valve 26 and the respective outlet to the consumer connected to the switching valve 26.

The switching valves 26, like the overpressure valve 24, may be of lightweight construction in which only plastic is used, with the exception of magnetic flux carrying parts.

As a supplement to the embodiments of FIGS. 1 to 5, a second cleaning medium supply connection can be provided, which, by way of example, is configured for compressed air as the cleaning medium. This is then followed by a second central supply channel which, in the cross-sectional plane B-B or alternatively C-C of FIG. 4 and FIG. 5, is arranged above or below the first central supply channel 32 for a cleaning medium and is hermetically separated from it by a suitable three-dimensional structuring of the housing. The second central supply channel can supply one or more of the switching valves with compressed air as a second cleaning medium. These are then not connected to the first central supply channel 32.

FIG. 6 shows measuring signal responses 4, 6 to a measuring signal 2 according to the method according to the invention. The horizontal axis represents the time axis t, the vertical axis the current I, each in arbitrary units. The measuring signal 2 contains a series of 11 current pulses with a duty cycle of about 40%. The individual pulses have a length of approximately 5 to 10 µs. This measuring signal 2 is fed into a measuring circuit via, in this case, a switching valve. The current responses 4, 6 show a typical behavior for a resonant circuit in that the current response 4, 6 increases within each pulse and decreases in the pauses between the pulses. The magnitude of each rise exceeds the magnitude of the decay in each period, so that the response signals 4, 6 increase overall.

The current response 4 represents a closed valve state, and current response 6 represents an open valve state. The two current responses are clearly distinguishable from each other at the selected parameters for the individual pulses after approximately 9 to 11 pulses, which is due to the changed inductance of the measuring circuit due to the shift of the valve armature. In this case, the measuring signal is too small to bring about a change in the armature position of the valve armature by itself. In measuring circuits with a plurality of switching valves, it can also be determined in this way whether two or more valve armatures are in an open position.

All the features mentioned, including those to be taken from the drawings alone, as well as individual features disclosed in combination with other features, are considered essential to the invention, both alone and in combination. Embodiments according to the invention may be fulfilled by individual features or a combination of a plurality of features. In the framework of the invention, features marked "in particular" or "preferably" are to be understood as optional features.

REFERENCE LIST

2 Measuring signal
4 Current response with closed valve
6 Current response with open valve
10 Valve block
12 Cover
14 Electronic control unit
15 Circuit board
16 Connection
17 Contact surfaces
20 Valve manifold housing
21 Fixing points
22 Cleaning medium supply connection
24 Switchable overpressure valve
26 Switching valve
28 Connection grommet
30 Contact spring
32 Central supply channel
34 Wall opening
36 Coil body of the overpressure valve
38 Coil body of the switching valve
40 Valve armature
41 Sealing cone
42 Clearance
44 Cleaning medium outlet
46 Spring
48 Coil
49 Coil core
50 Magnetic return element
52 Structuring

The invention claimed is:

1. A valve block (10) for use in supplying cleaning medium to a plurality of consumers, comprising:
at least one cleaning medium supply connection (22);
a plurality of switching valves (24, 26) connected to the at least one cleaning medium supply connection (22);
a control unit (14) which is configured to actuate the switching valves (24, 26) in an alternating manner individually and/or a plurality of the switching valves (24, 26) simultaneously; and
a position detection unit which is configured to determine the switching position of at least one switching valve (24, 26) without a sensor,
wherein a side of a valve manifold housing (20) of the valve block (10) has valve connections (28) arranged thereon, the side of the valve manifold housing (20) having an orientation-giving structuring (52) which is mirror-image and rotationally asymmetrical.

2. The valve block (10) according to claim 1, characterized in that the position detection unit is configured as part of the control unit (14).

3. The valve block (10) according to claim 1, characterized in that at least one of the switching valves (24, 26) is configured as a switchable overpressure valve (24).

4. The valve block (10) according to claim 3, characterized in that the at least one switchable overpressure valve (24) is fed axially and the other switching valves (26) are fed radially with a cleaning medium.

5. The valve block (10) according to claim 3, characterized in that the switching valves (26) are kept closed with a first spring force and the at least one switchable overpressure valve (24) is kept closed with a second spring force, which is greater than the first spring force, and has a different coil body (36) than the switching valves (26).

6. The valve block (10) according to claim 1, characterized in that the position detection unit is configured, by means of an LED driver unit, to feed into at least one current measurement circuit comprising one or a plurality of the switching valves (24, 26), one measuring signal (2) comprising a pulse-width modulated signal, with a plurality of pulses, which is dimensioned such that the position of the switching valve or switching valves (24, 26) is not influenced, and to measure the course of the current intensity (4, 6) and to compare it with one or more expected values which form a measure of whether and how many of the switching valves (24, 26) in the current measurement circuit are in an open position.

7. The valve block (10) according to claim 6, characterized in that a separate current measurement circuit is present for each switching valve (24, 26), wherein the measurement in each current measurement circuit is carried out individually in cyclical sequence via the switching valves, or with respect to a sum signal from all current measurement circuits, wherein a separate current measurement circuit is present for at least one switchable overpressure valve (24), which current measurement circuit is evaluated with respect to the position of the at least one switchable overpressure valve (24).

8. The valve block (10) according to claim 1, characterized in that the connection of the at least one cleaning medium supply connection (22) to the switching valves (24, 26) occurs via at least one central supply channel (32), which central supply channel, on two opposite sides, respectively has connections comprising wall openings (34), to the individual switching valves (24, 26), which switching valves are arranged in two rows on both sides of the at least one central supply channel (32), wherein a plurality of cleaning medium supply connections (22) and supply channels (32) for different cleaning media comprising a washing liquid and compressed air are provided, which are connected to different switching valves (26).

9. The valve block (10) according to claim 1, characterized in that the valve armatures (40) of the switching valves (26) are each mounted with an interspace (42) in the switching valve (26), which switching valve is in fluid connection with the cleaning medium supply connection (22) and is sealed off from an axially rear part, which is arranged opposite the respective cleaning medium outlet of the switching valve (26), wherein the fluid also acts on the rear side of the valve armature (40), and/or the valve armatures (40) of the switching valves (26) each have a sealing cone (41).

10. The valve block (10) according to claim 1, characterized in that the switching valves (26) are provided or can be provided with individually weldable valve connections (28).

11. A method for supplying cleaning medium with a valve block (10) according to claim 1, wherein the control unit (14) of the valve block (10) controls one or a plurality of the switching valves (24, 26) of the valve block (10) in order to open or close them, wherein the position detection unit determines the switching position of at least one switching valve (24, 26) in a manner without sensors, wherein the position detection unit feeds into at least one current measuring circuit comprising one or more of the switching valves (24, 26), a measuring signal (2) comprising a pulse width modulated measuring signal (2), with a plurality of pulses, which is dimensioned such that the position of the switching valve or switching valves (24, 26) is determined, which comprises one or a plurality of the switching valves (24, 26), a measuring signal (2) comprising a pulse-width-modulated measuring signal (2), with a plurality of pulses, which is dimensioned such that the position of the switching valve or the switching valves (24, 26) is not influenced, measures the course of the current intensity and compares it with one or more expected values, which form a measure of how many of the switching valves (24, 26) in the current measuring circuit are in an open position.

* * * * *